United States Patent
Suzuki et al.

(10) Patent No.: US 9,333,607 B2
(45) Date of Patent: May 10, 2016

(54) MACHINE TOOL HAVING WORKPIECE MEASUREMENT FUNCTION

(75) Inventors: Toshihiro Suzuki, Aiko-gun (JP); Shinji Terakawa, Aiko-gun (JP); Yuta Showa, Aiko-gun (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 434 days.

(21) Appl. No.: 14/115,722

(22) PCT Filed: May 19, 2011

(86) PCT No.: PCT/JP2011/062035
§ 371 (c)(1),
(2), (4) Date: Nov. 5, 2013

(87) PCT Pub. No.: WO2012/157126
PCT Pub. Date: Nov. 22, 2012

(65) Prior Publication Data
US 2014/0080689 A1    Mar. 20, 2014

(51) Int. Cl.
*B23Q 3/155* (2006.01)
*B23Q 3/157* (2006.01)
(Continued)

(52) U.S. Cl.
CPC ............ *B23Q 3/155* (2013.01); *B23Q 3/15706* (2013.01); *B23Q 11/08* (2013.01);
(Continued)

(58) Field of Classification Search
CPC .. B23Q 3/155; B23Q 3/1556; B23Q 3/15706; B23Q 17/20; B23Q 17/22; Y10T 409/303864; Y10T 483/115; Y10T 483/1733; Y10T 483/1736
USPC ................. 483/3, 30, 31, 66, 67, 68; 409/133
See application file for complete search history.

(56) References Cited

U.S. PATENT DOCUMENTS 5,056,235 A * 10/1991 Thomas ............... G01B 21/047
33/503
5,065,035 A * 11/1991 Juengel ................ B23Q 1/0009
250/551

(Continued)

FOREIGN PATENT DOCUMENTS

JP    9-201744    8/1997
JP    2007-331067    12/2007

(Continued)

OTHER PUBLICATIONS

EPO Machine Translation of JP2008023661—Fujimura et al., "Automatic Tool Exchanger," Feb. 7, 2008.*

(Continued)

*Primary Examiner* — Sunil K Singh
*Assistant Examiner* — Michael Vitale
(74) *Attorney, Agent, or Firm* — Morrison & Foerster LLP

(57) ABSTRACT

A machine tool including a tool magazine (20) arranged in a storage region adjacent to a working region of a workpiece to store a working tool (31) for working the workpiece and a measurement tool (32) for measuring the workpiece; a spindle (10) to which the working tool and the measurement tool are attached in a detachable manner, the spindle being provided in a movable manner relative to the workpiece; a shutter (40) provided between the working region and the storage region in an openable and closable manner; a transceiver (51) attached to the measurement tool; and a communication module (52) arranged in the storage region to communicate with the transceiver of the measurement tool attached to the spindle.

3 Claims, 6 Drawing Sheets

(51) Int. Cl.
*B23Q 11/08* (2006.01)
*B23Q 17/20* (2006.01)
*B23Q 17/22* (2006.01)

(52) U.S. Cl.
CPC ............ *B23Q 17/20* (2013.01); *B23Q 17/22* (2013.01); *Y10T 409/303864* (2015.01); *Y10T 483/115* (2015.01); *Y10T 483/1733* (2015.01); *Y10T 483/1882* (2015.01)

(56) References Cited

U.S. PATENT DOCUMENTS

| | | | | |
|---|---|---|---|---|
| 5,918,378 | A * | 7/1999 | McMurtry | G01B 7/012 33/556 |
| 6,543,150 | B2 * | 4/2003 | Matsumiya | G01B 7/012 33/503 |
| 7,665,219 | B2 * | 2/2010 | Styles | G01B 5/012 33/503 |
| 2010/0206068 | A1 * | 8/2010 | Butter | G01B 21/047 73/431 |

FOREIGN PATENT DOCUMENTS

| | | |
|---|---|---|
| JP | 2008-23661 | 2/2008 |
| JP | 2008-203270 | 9/2008 |
| JP | 2010-234464 | 10/2010 |
| WO | WO-02/24405 | 3/2002 |

OTHER PUBLICATIONS

Communication pursuant to Rules 70(2) and 70a(2) EPC dated Dec. 9, 2014, Directed towards EP Application No. 11865883.0; 8 pages.
International Search Report mailed Aug. 9, 2011, directed to International Application No. PCT/JP2011/062035; 5 pages.

* cited by examiner

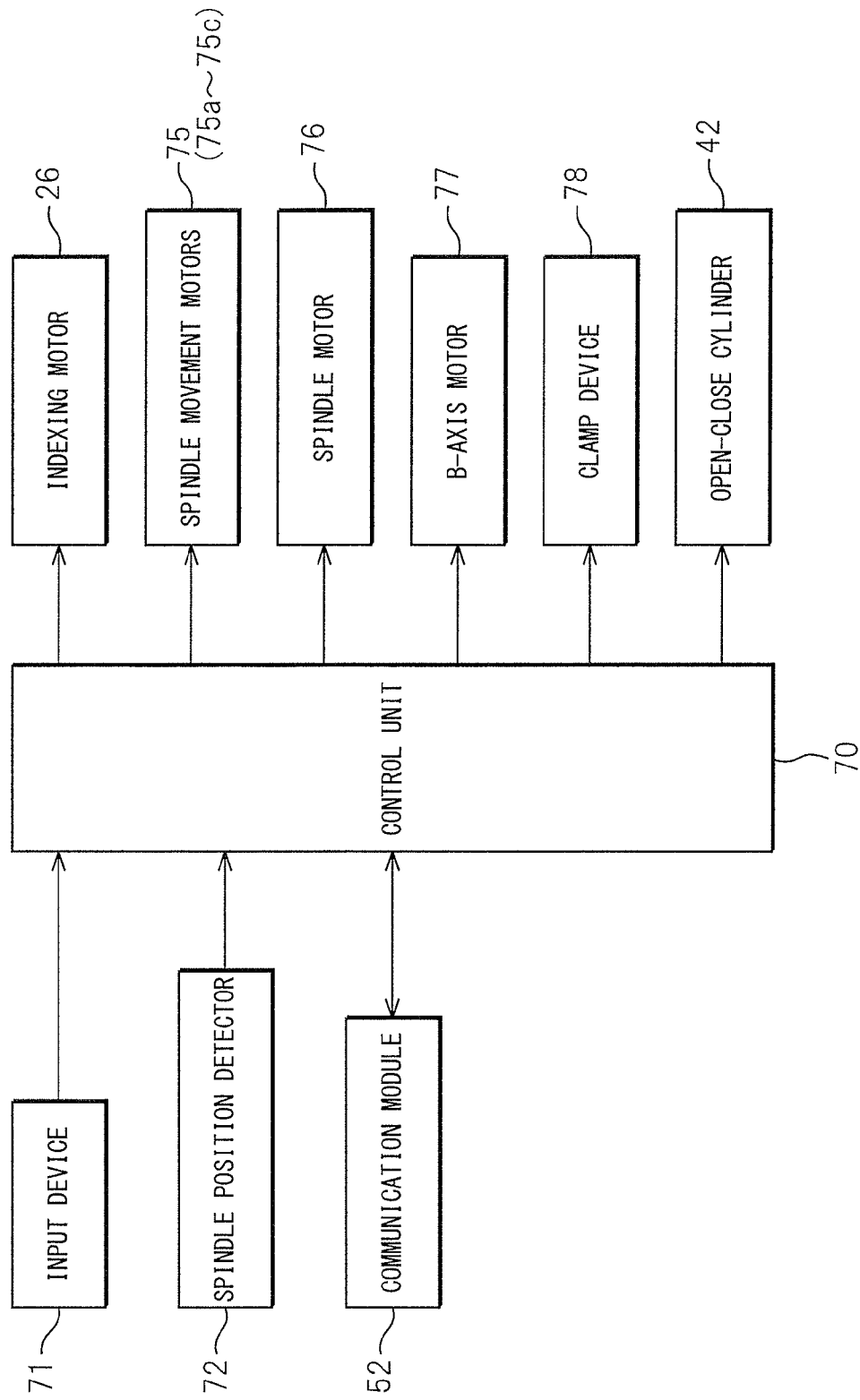

MACHINE TOOL HAVING WORKPIECE MEASUREMENT FUNCTION

REFERENCE TO RELATED APPLICATIONS

This application is the national stage application under 35 USC 371 of International Application No. PCT/JP2011/062035, filed May 19, 2011, the entire contents of which are incorporated herein by reference.

FIELD OF THE INVENTION

The present invention relates to a machine tool which attaches a measurement tool to a spindle in a detachable manner and which has a workpiece measurement function for measuring the dimensions, etc. of a workpiece.

BACKGROUND OF THE INVENTION

A system which attaches a measurement tool to the spindle of a machine tool in a detachable manner and which moves the measurement tool relative to the workpiece so as to measure the dimensions, etc. of the workpiece, has been known (for example, see Patent Literature 1). In the system described in this Patent Literature 1, a transceiver is attached to the measurement tool and a transceiver module is attached above the measurement tool (ceiling of splash guard) to communicate between the measurement tool and the transceiver module via an infrared beam, radio wave, ultrasonic wave, or other spatial carrier wave.

However, in the system described in the above Patent Literature 1, since the transceiver module is attached to the ceiling of the splash guard, splatter of chips, fluid, etc. deposits on the transceiver module at the time of machining the workpiece and is liable to obstruct communication between the measurement tool and the transceiver module.

Japanese Unexamined Patent Publication No. 2007-331067A

SUMMARY OF THE INVENTION

The present invention provides a machine tool having a workpiece measurement function for measuring a dimension of a workpiece, including: a tool magazine arranged in a storage region adjacent to a working region of a workpiece to store a working tool for working the workpiece and a measurement tool for measuring the workpiece; a spindle to which the measurement tool is attached in a detachable manner, the spindle being provided in a movable manner relative to the workpiece; a shutter provided between the working region and the storage region in an openable and closable manner: and a communication module arranged in the storage region to communicate with the measurement tool attached to the spindle.

BRIEF DESCRIPTION OF THE DRAWINGS

FIG. 8 is a block diagram which shows the configuration of a control device of a machine tool according to an embodiment of the present invention.

DETAILED DESCRIPTION OF THE INVENTION

Figure 1:
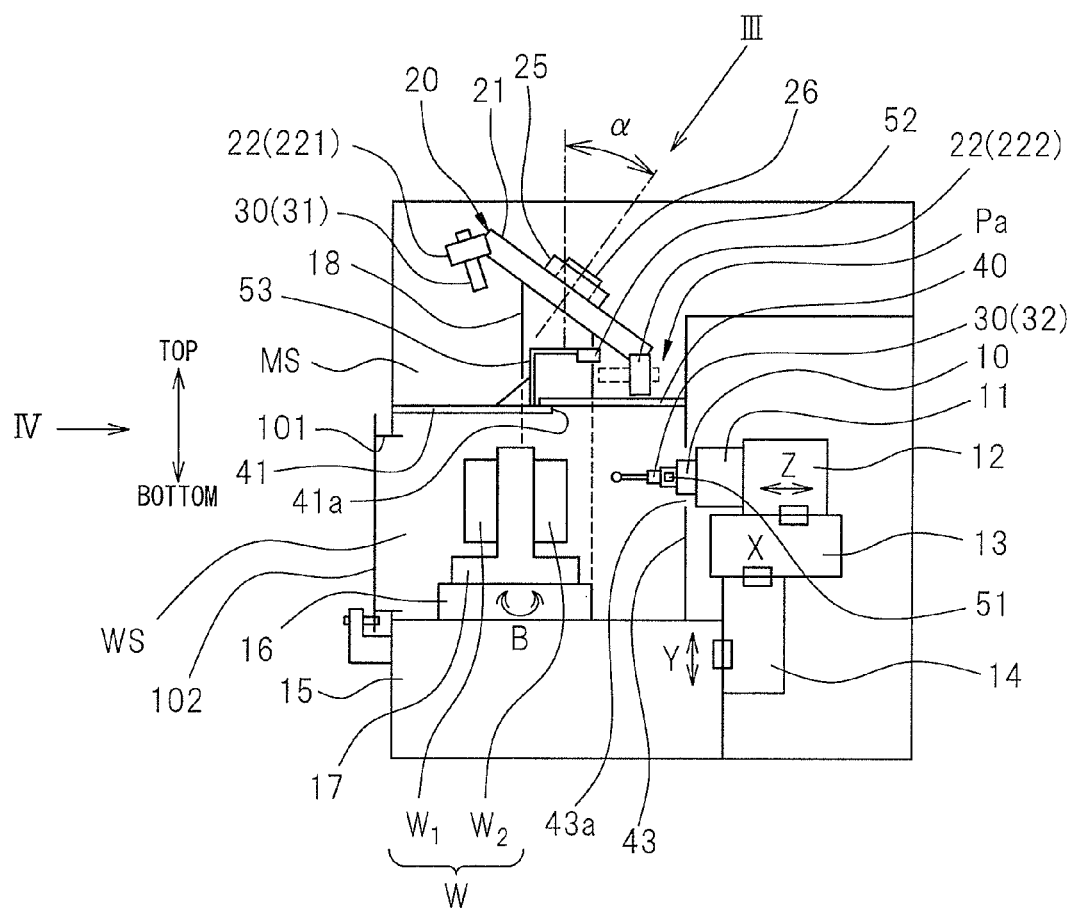
FIG. 1 is a side view which shows a general configuration of a machine tool according to an embodiment of the present invention.
Figure 2:
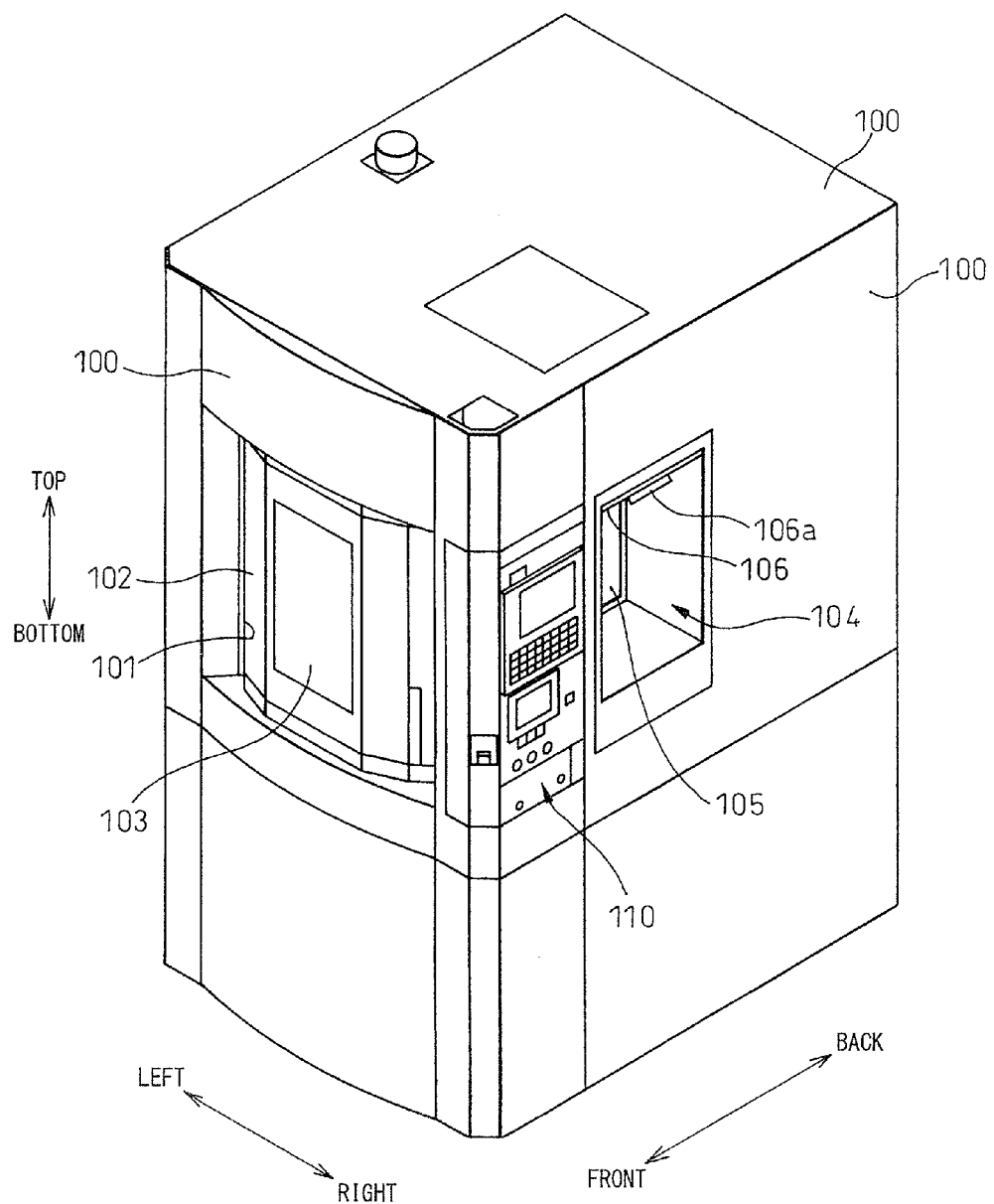
FIG. 2 is a perspective view of the appearance of a machine tool according to an embodiment of the present invention.

Below, referring to FIG. 1 to FIG. 8, an embodiment of a machine tool having a workpiece measurement function according to the present invention will be explained. FIG. 1 is a side view which shows the general configuration of a machine tool according to an embodiment of the present invention. As one example, a horizontal type machining center which has an automatic tool changing function is shown. FIG. 2 is a perspective view of the appearance of this machining center. Below, for convenience, as illustrated, a front-back direction, left-right direction, and top-bottom direction are defined and the configurations of the parts are explained in accordance with these definitions.

As shown in FIG. 1, the machining center according to the present embodiment has a spindle 10 which is provided in a movable manner relative to a workpiece W, a tool magazine 20 which stores various tools 30 which can be attached to the spindle 10, and a shutter 40 which is provided between the workpiece W and the tool magazine 20 in an openable and closable manner. The tools 30 are transferred between the spindle 10 and the tool magazine 20 through a tool changing system. The tools 30 include a plurality of working tools 31 for working a workpiece and a measurement tool 32 for measuring a workpiece. When working a workpiece, a working tool 31 is attached to the spindle 10, while when measuring a workpiece, the measurement tool 32 is attached to the spindle 10. FIG. 1 shows the workpiece measurement state where the measurement tool 32 is attached to the spindle 10.

As shown in FIG. 2, the machining center forms a box shape as a whole. Its front and back surfaces, left and right surfaces, and top and bottom surfaces are covered by covers 100. The front surface cover 100 is provided with an opening part 101. The opening part 101 is opened and closed by a door 102 which can slide in the left-right direction. In the state with the door 102 opened, the workpiece W can be changed, etc. The door 102 is provided with a monitoring window 103. The right surface cover 100 is provided with a control panel 110 in a recessed part at the front side. Various commands can be input from the control panel 110.

Part of the right surface cover 100 is sunken to the inside (left) whereby a recessed part 104 is formed. At the back surface (left surface) of the recessed part 104, a monitoring window 105 is attached. At the top surface of the recessed part 104, a door 106 is pivotally attached about a hinge part. The door 106 can be opened by swinging a handle 106a downward. At the inside of the door 106, the tool magazine 20 is arranged. The door 106 is opened to change the tools 30 which are stored in the tool magazine 20.

As shown in FIG. 1, the spindle 10 is rotatably provided at the spindle head 11 about an axis of rotation in the front-back direction. The spindle head 11 is provided at the front of a front-back movement member 12. The front-back movement member 12 is movably supported move in the front-back direction (Z-direction) on the top surface of a left-right movement member 13 through a linear feed mechanism. The left-right movement member 13 is movably supported in the left-right direction (X-axial direction) on the top surface of a top-bottom movement member 14 through a linear feed mechanism. The top-bottom movement member 14 is movably supported in the top-bottom direction (Y-axial direction)

at the back surface of the bed 15 through a linear feed mechanism. The linear feed mechanisms in the front-back direction, left-right direction, and top-bottom direction are, for example, comprised of guide devices provided with guide rails and guide blocks and drive devices provided with ball screws and servo motors which drive rotation of the ball screws. A tool 30 attached to the spindle 10 is driven to rotate by a spindle motor 76 inside of the spindle head 11.

At the top surface of the bed 15, a table 16 is set. The table 16 can, for example, be rotated by a servo motor in the B-axial direction about an axis of the vertical direction for a feed operation. On the top surface of the table 16, an angle plate 17 is set. At the front and back surfaces of the angle plate 17, workpieces W1 and W2 are respectively attached. The workpiece W1 is attached facing the door 102, while the workpiece W2 is attached facing the front end portion of the tool 30. By using such an angle plate 17, while the back surface workpiece W2 is worked, the door 102 can be opened to attach and detach the front surface workpiece W1. For this reason, there is no need to interrupt working a workpiece each time attaching or detaching a workpiece W, and therefore a plurality of workpieces W can be efficiently and continuously worked.

Due to the above configuration, a tool 30 can move relative to a workpiece W2 in three orthogonal axial directions (X-, Y-, and Z-axial directions) and one rotational direction (B-axial direction), so a workpiece W2 can be worked to a desired shape. Note that, the table 16 can also be configured to be able to rotate about the axis in the front-back direction and the machining center can be made a five-axis machine which enables relative movement in three orthogonal axial directions and two rotational directions (B- and C-axial directions). The X-axis, Y-axis, Z-axis, and B-axis servo motors are provided with rotation detectors which detect the amounts of motor rotations. The signals from these sensors are used to calculate the relative positions between the workpiece W and the spindle 10.

At the left and right sides of the bed 10, a pair of left and right support columns 18 are provided to stand. At the top end portions of the left and right support columns 18, a magazine base 25 is attached stretching in the left-right direction (see FIGS. 3 and 4). On the magazine base 25, the tool magazine 20 is rotatably supported. The magazine base 25 is provided inclined, so that its front side is high and back side is low. The tool magazine 20 is also similarly provided inclined. That is, the tool magazine 20 is inclined, so that the angle formed by the vertical line and the axis of rotation of the tool magazine 20 becomes a predetermined inclined angle α.

Between the workpiece W and the tool magazine 20, a horizontal cover 41 is extended in the horizontal direction. Due to the horizontal cover 41, the inside space of the cover 100 is partitioned into a top and bottom. That is, it is partitioned into a working region WS of the workpiece W and a storage region MS where the tool magazine 20 is stored. The horizontal cover 41 prevents chips and fluid from splattering into the storage region MS when working the workpiece. At the back portion of the horizontal cover 41, an opening part 41a (see FIG. 4) of a substantially rectangular shape when viewed by a plan view is provided. At the horizontal cover 41, a shutter 40 is slidably attached in the left-right direction.

On the other hand, in front of the movement members 12 to 14, a spindle head cover 43 is provided to stand. A working chamber (working region) WS is formed below the horizontal cover 41 and in front of the spindle head cover 43. The spindle head cover 43 is provided with an opening part 43a. The spindle 10 and tool 30 pass through the spindle head cover 43 via the opening part 43a. The spindle head cover 43 can be rolled up in the top-bottom direction and left-right direction. Along with up-down motion and left-right motion of the tool 30, the opening part 43a also moves up-down and left-right.

Figure 3:
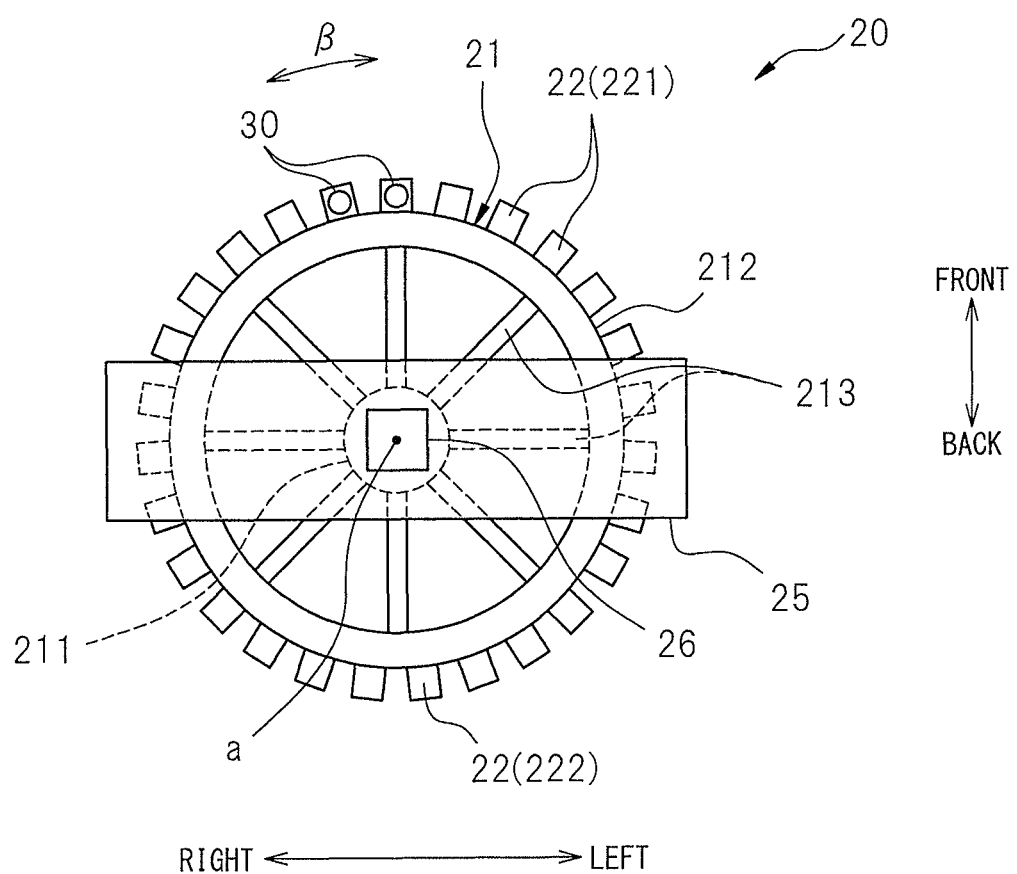
FIG. 3 is a view along an arrow III of FIG. 1.
Figure 4:
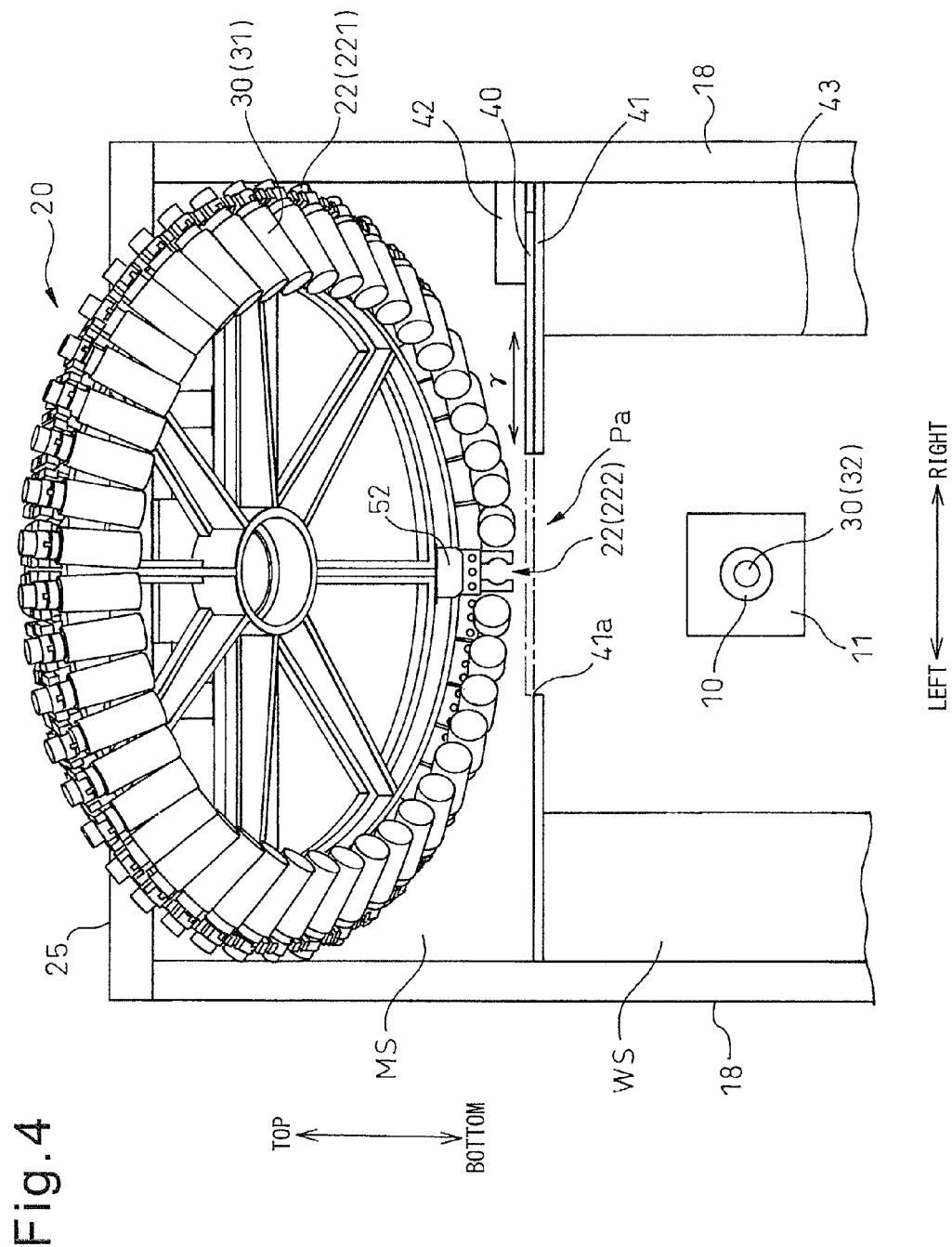
FIG. 4 is a view along an arrow IV of FIG. 1.

FIG. 3 is a back view which shows the general configuration of a tool magazine 20, that is, a view of the tool magazine 20 seen from an inclined angle α direction (view along arrow III of FIG. 1), while FIG. 4 is a view along the arrow IV of FIG. 1 which shows the configuration of the tool magazine 20 in more detail. FIGS. 3 and 4 show the workpiece measurement state where the measurement tool 32 is attached to the spindle 10.

As shown in FIG. 3, the tool magazine 20 has a rotary frame 21 which is rotatably supported in an arrow β direction centered about a point "a" of the figure and a plurality of tool holding parts which are provided at the peripheral edge parts of the rotary frame 21, that is, grippers 22. At the center portion in the left-right direction of the magazine base 25, a motor 26 for indexing the tool magazine 20 (indexing motor) is attached. The indexing motor 26 is, for example, configured by a servo motor.

The rotary frame 21 has a substantially circular hub part 211 which is connected to an output shaft of the indexing motor 226, a ring-shaped gripper support part 212 which is provided concentrically with the hub 211 at the circumference of the hub 211, and spoke parts 213 which extend radially from the hub 211 and connect the hub 211 and the gripper support part 212.

The grippers 22 are provided at the gripper support part 212 at equal intervals in the circumferential direction. The grippers 22 respectively hold tools 30 in a detachable manner. The grippers 22 have working tool grippers 221 which hold working tools 31 and a measurement tool gripper 222 which holds a measurement tool 32. For convenience of explanation, the grippers 22 are divided into two types. However, in practice the grippers 221 and 222 are equivalent in shape, and thus the same gripper can hold a working tool 31 or the measurement tool 32.

In the workpiece measurement state of FIGS. 3 and 4, as explained later, the measurement tool 32 is indexed by rotation to a tool change position Pa. The "tool change position Pa" is the position where the gripper 22 approaches the spindle 10 the most, that is, the gripper position at the bottommost portion and backmost portion of the tool magazine 20. The tool 30 is held by the gripper 22 inclined with respect to the tool magazine 20 by an angle corresponding to the inclination angle α of the tool magazine 20, so that the axial line direction of the tool 30 faces the front-back direction at this tool change position Pa. Due to this, the axial line of the tool 30 indexed to the tool change position Pa and the axial line of the spindle 10 can be made to match each other. In FIG. 4, a measurement tool 32 is attached to the spindle 10 and the gripper 22 at the tool change position Pa (measurement tool gripper 222) is empty.

At the time of tool change, the spindle 10 rises up to the tool change position Pa. For this reason, by designing the tool magazine 20 to be slanted and hold the tool 30, the tool change position Pa can be set close to the working region WS and the amount of movement above the spindle 10 can be suppressed.

Figure 5:
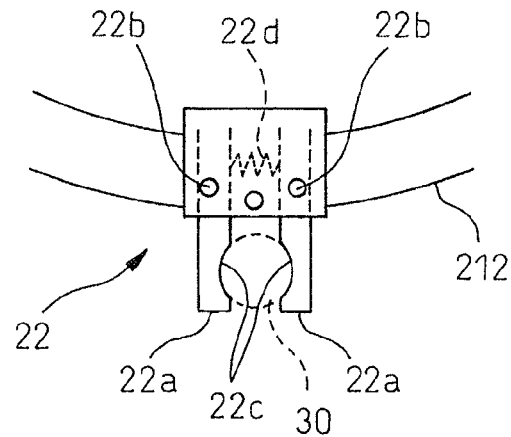
FIG. 5 is an enlarged view of a gripper of FIG. 4.
Figure 6:
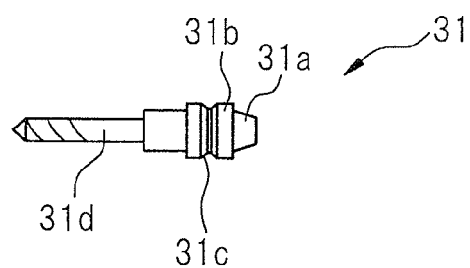
FIG. 6 is a side view which shows an example of a working tool.
Figure 7:
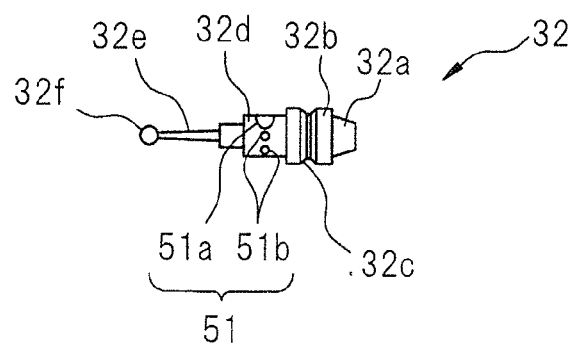
FIG. 7 is a side view which shows an example of a measurement tool.

FIG. 5 is an enlarged view of a gripper 22. As shown in FIG. 5, each gripper 22 has a pair of grasping members 22a which are arranged to face each other in the circumferential direction. Each grasping member 22a is pivotally supported at the gripper support part 212 through a pin 22b. The inside and the outer diameter sides of the pair of grasping members 22a are formed with curved recessed parts 22c, corresponding to the V-grooves 31c and 32c of the tool 30 (FIGS. 6 and 7). At the inside and inner diameter sides of the pair of grasping members 22a, a spring 22d is connected. Due to the biasing force of the spring 22d, the tool 3 is gripped at the inside of the curved recessed parts 22c.

As shown in FIG. 4, the opening part 41a of the horizontal cover 41 which separates the working region WS and the storage region MS opens downward from the tool change position Pa. The storage region MS is provided with an open-close cylinder 42. Due to the drive operation of the open-close cylinder 42, the shutter 40 slides in the left-right direction (arrow γ of figure) whereby the opening part 41a opens and closes. The open-close cylinder 42 is, for example, configured by an air cylinder. The shutter 40 may be a type which slides in the front-back direction or a butterfly hinge type or any other configuration.

FIG. 6 is a side view which shows one example of a working tool 31, while FIG. 7 is a side view which shows one example of a measurement tool 32. As shown in FIG. 6, the working tool 31 has a shank 31a, flange 31b, V-groove 31c, and tool part 31d (in the figure, a drill) along the axis of rotation. The circumferential surface of the shank 31a forms a tapered shape which narrows toward the back end face so as to fit in a tight state with a taper hole (not shown) of the front end portion of the spindle 10 and be clamped by a clamp device 78 (FIG. 8) provided at the spindle 10. The clamp device 78 is, for example, a draw bar with a collet which pulls in the shank 31a of the working tool 31 to the back of the spindle 10, or other known device.

As shown in FIG. 7, the measurement tool 32 has a shank 32a, flange 32b, V-groove 32c, tubular part 32d, and touch probe 32e along the axis of rotation and includes a battery and switch circuit. The shank 32a, flange 32b, and V-groove 32c are the same shapes as the shank 31a, flange 31b, and V-groove 31c of the working tool 31. In the same way as the working tool 31, the measurement tool 32 can also be clamped to the spindle 10. The switch circuit outputs an ON signal (contact signal) when the contact 32f of the front end of the touch probe 32e contacts the measured object (workpiece W), and outputs an OFF signal (noncontact signal) when it separates from the measured object.

At the time of measurement of the workpiece, the rotation of the spindle 10 is stopped. In that state, the measurement tool 32 is made to move relative to the workpiece W to make the contact 32f of the front end of the touch probe 32e contact with a measured surface of the workpiece W. Due to this, the measurement tool 32 outputs an ON signal. By calculating the position of the working tool 31 when the ON signal is output, it is possible to measure the dimensions of the workpiece W.

At the circumferential surface of the tubular part 32d, a transceiver 51 which is able to communicate by a spatial carrier wave is attached. The transceiver 51 has a single receiver 51a which is arranged at a reference position in the circumferential direction of the measurement tool 32 and a plurality of transmitters 51b which are arranged at equal intervals in the circumferential direction adjoining the receiver 51a in the circumferential direction. The receiver 51a and the transmitters 51b are, for example, comprised by an infrared light receiving element and light emitting elements, and operate by power from a battery which is built in the measurement tool 32. The measurement tool 32 is stored in the tool magazine 20 so that the receiver 51a faces upward.

The receiver 51a and transmitters 51b of the transceiver 51 communicate with a communication module 52 which is arranged in the storage region MS through an infrared beam. Rather than an infrared beam, radio waves or ultrasonic waves may also be used for communication. That is, the communication medium between the transceiver 51 and the communication module 52 may be a spatial carrier wave other than an infrared beam. Communication of an optical type or radio wave type or other such type through a spatial carrier wave besides wired communication is sometimes called "wireless communication" as a whole.

As shown in FIG. 1, at the top surface of the horizontal cover 41, a bracket 53 is provided to stand. At the front end portion of the bracket 53, a communication module 52 is attached facing the transceiver 51 of the measurement tool 32 attached to the spindle 10. More specifically, the communication module 52, as shown in FIGS. 1 and 4, is arranged at the bottom side of the tool magazine 20 and at the same position in the left-right direction as the measurement tool gripper 222 at the tool change position Pa and is positioned above and behind the measurement tool gripper 222, so as to be prevented from interfering with the rotating tool magazine 20. In this case, the opening part 41a of the horizontal cover 41 is positioned between the transceiver 51 and the communication module 52, that is, on the line segment connecting the transceiver 51 and the communication module 52 by a straight line or near that line segment. In short, the communication module 52 should have the receiver 52a and transmitter 52b oriented in the direction of the opening part 41a of the horizontal cover 41 and should be arranged at a position in the storage region MS where the communication module can communicate with the transceiver 51 of the measurement tool 32 attached to the spindle 10 when the shutter 40 is in the opened state. Further, between the transceiver 51 and the communication module 52, the measurement tool gripper 222 in the workpiece measurement state is also positioned. In FIG. 4, illustration of the bracket 53 is omitted.

In FIG. 1, the communication module 52 has a receiver 52a which receives infrared beam signals sent from the transmitters 51b of the measurement tool 32 and a transmitter 52b which transmits an infrared beam signal to the receiver 51a of the measurement tool 32. The signal which is received by the receiver 52a includes an on-off signal which the touch probe 32e outputs, while the signal which is sent by the transmitter 52b includes a signal corresponding to the power on-off command of the measurement tool 32.

The transmitter 52b of the communication module 52 generates, for example, a spatial carrier wave in an enlarged conical shape. For this reason, when moving the measurement tool 32 in the working region WS to measure the workpiece W, the receiver 51a of the measurement tool 32 can be positioned at the inside of the conical carrier wave and the signal from the transmitter 52b can be easily received by the receiver 51a.

On the other hand, since a plurality of transmitters 51b of the transceiver 51 are provided at the circumferential surface of the measurement tool 32 over the circumferential direction, the transmitters 51b can transmit signals radially from the circumferential surface of the measurement tool 32. Therefore, at the time of measurement of a workpiece, the signal from one of the transmitters 51b can be reliably received by the receiver 52a. In order to improve the communication ability with the transceiver 51, it is also possible to provide a plurality of communication modules at different positions from each other in the storage region MS.

The operation of the thus configured machine tool is controlled by the control device. FIG. 8 is a block diagram which shows the main configuration of the control device according to the present embodiment.

The control device has an input device 71 which inputs various information relating to changing of tools, working of a workpiece, and measurement of a workpiece, a spindle position detector 72 which detects a position of the spindle 10, a communication module 52 which is positioned inside of the storage region MS, a control unit 70 which performs processing relating to working of a workpiece and measurement of a workpiece, an indexing motor 26 which drives to rotate the tool magazine 20, a spindle movement motor 75 which moves the spindle 10, a spindle motor 76 which drives to rotate the spindle 10, a B-axis motor 77 which drives to rotate the table 16, a clamp device 78 which clamps a tool 30 at the spindle 10, and an open-close cylinder 42 which opens and closes the shutter 40.

The input device 71 includes the control panel 110 and an NC program reading unit. The spindle position detector 72 is configured by rotation detectors which are attached to the X-axis, Y-axis, and Z-axis servo motors. The spindle movement motor 75 includes the X-axis, Y-axis, and Z-axis servo motors (X-axis motor 75a, Y-axis motor 75b, and Z-axis motor 75c). The control unit 70 is configured including a processing system which has a CPU, ROM, RAM, and other peripheral circuits.

The control unit 70 receives as input signals from the input device 71, spindle position detector 72, and communication module 52. The control unit 70 performs a predetermined processing based on these signals to output control signals to the communication module 52, indexing motor 26, spindle movement motor 75, spindle motor 76, B-axis motor 77, open-close cylinder 42, and clamp device 78.

Below, the main operations of the machine tool according to the present embodiment, in particular the operation by the processing of the control unit 70, will be explained.

(1) At the Time of Working a Workpiece

At the time of working a workpiece, a working tool 31 is attached to the spindle 10, and the spindle movement motor 75 and B-axis motor 77 are driven in accordance with an NC program. Due to this, the working tool 31 relatively moves with respect to the workpiece W. The working tool 31 is rotated by the drive operation of the spindle motor 76 and the workpiece W (W2) is worked. When working the workpiece in this way, the shutter 40 is closed by the open-close cylinder 42 and the opening part 41a is closed. Due to this, chips, fluid, and other splatter generated at the time of working the workpiece can be prevented from sticking to the surface of the communication module 52 inside the storage region MS and the surfaces of the other working tools 31 and the measurement tool 32 which are stored in the tool magazine 20.

When working a workpiece, if a tool changing command is input from the input device 71, the working tool 31 of the spindle 10 is automatically changed to another working tool 31 by the tool changing system in the following way. In the following explanation, for convenience, the working tool 31 before change will be referred to as the "first working tool" and the working tool 31 after change will be referred to as the "second working tool".

When a tool change is commanded, first the drive operation of the spindle motor 76 is stopped and the X-axis motor 75a and Z-axis motor 75c are controlled so that the positions of the spindle 10 in the front-back direction (Z-axial direction) and left-right direction (X-axial direction) match the tool change position Pa. Next, the shutter 40 is open by a drive operation of the open-close cylinder 42 and further an empty gripper 221 for storing the first working tool 31 is indexed to the tool change position Pa.

In this state, the Y-axis motor 75b is controlled so that the spindle 10 rises to the tool change position Pa. If the spindle 10 rises to the tool change position Pa, the V-groove 31 of the first working tool 31 attached to the spindle 10 is engaged with gripping claws 22a of the empty gripper 22 (221). In this engaged state, the first working tool 31 is unclamped by the clamp device 78, and the spindle 10 is retracted to a position which does not interfere with the tool magazine 20 by the drive operation of the Z-axis motor 75c. Due to this, it is possible to transfer the first working tool 31 to the working tool gripper 221.

Next, the tool magazine 20 is rotated by the drive operation of the indexing motor 26 to index a second working tool 31 to be used for the next working operation to the tool change position Pa. After that, the spindle 10 is advanced to the tool change position Pa by the drive operation of the Z-axis motor 75a, and the second working tool 31 is clamped to the spindle 10 by the clamp device 78. When the clamp of the second working tool 31 is completed, the spindle 10 is descended by the drive operation of the Y-axis motor 75b to move the second working tool 31 into the working region WS.

After that, the shutter 40 is closed by the drive operation of the open-close cylinder 42 and the second working tool 31 is driven to rotate by the drive operation of the spindle motor 76. With the above, the tool automatic changing operation is ended. After this, an NC program is run to relatively move the second working tool 31 with respect to the workpiece W, then a new working tool 31 is used to work the workpiece W.

(2) At the Time of Measuring Workpiece

After finishing working the workpiece W, if a workpiece measurement command is input from the input device 71, the tool which is attached to the spindle 10 is automatically changed from a working tool 31 to the measurement tool 32 by a similar procedure as the above procedure. That is, the shutter 40 is opened and the rotation of the spindle 10 is stopped. In that state, the spindle 10 is moved to the tool change position Pa. Further, the clamp device 78 is unclamped and the working tool 31 is transferred to the working tool gripper 221.

Next, the measurement tool 32 stored in the tool magazine 20 is indexed to the tool change position Pa by the drive operation of the indexing motor 26. The measurement tool 32 is clamped by the clamp device 78 and, as shown in FIG. 1, is moved to the working region WS. In this case, since the tool magazine 20 stores the measurement tool 32 so that the receiver 51a of the measurement tool 32 faces upward, the measurement tool 32 is clamped at the spindle 10 in the reference state with the receiver 51a facing upward. After the measurement tool 32 moves to the working region WS, as shown in FIG. 4, the shutter 40 is left in the open state and the empty gripper 222 for the measurement tool is left indexed to the tool change position Pa.

After that, due to a command from the control unit 70, a signal corresponding to the power on command (power ON signal) is sent from the communication module 52. When the receiver 51a at the circumferential surface of the measurement tool 32 receives the power ON signal, the power of the measurement tool 32 (the power of the switch circuit) is turned on and the workpiece can be measured. Next, the spindle motor is driven to rotate so that a transmitter 51b of the measurement tool 32 faces the communication module 52 and the position of the measurement tool 32 is shifted from the reference state by a predetermined amount (for example, 180°).

In this state, the spindle 10 is relatively moved with respect to the workpiece W and the contact 32f of the front end of the measurement tool 32 is made to contact the measurement position on the workpiece surface. If the contact 32f contacts the workpiece surface, the touch probe 32e outputs an ON signal. This ON signal is sent from the transmitter 51b and is received by the receiver 52a in the storage region MS. The signal which the receiver 52a receives is acquired by the control unit 70. The control unit 70 can calculate the workpiece surface position from the positional coordinates of the spindle 10 when the ON signal is generated.

When the measurement of the workpiece by the touch probe 32*e* finishes, the spindle motor 76 is driven to rotate and the phase of the measurement tool 32 is returned to the reference state. In this state, due to a command from the control unit 70, a signal corresponding to the power OFF command (power OFF signal) is sent from the communication module 52. When the receiver 51*a* of the measurement tool 32 receives the power OFF signal, the power of the measurement tool 32 is turned off and the workpiece measurement operation ends.

The control unit 70 of FIG. 8 may be connected to a shutter open-close detector which detects an open-close state of the shutter 40, a clamped state detector which detects a clamped state of the tool 30 which is attached to the spindle 10, an indexing position detector which detects an indexing position of the tool magazine 20, etc., so that the signals from these detectors can be used to monitor the operating states of the parts while performing the processing at the control unit 70. In the above explanation, the indexing motor 26, spindle movement motor 75, clamp device 78, control unit 70, etc. form the tool changing system. However, the tool changing system is not limited to this configuration.

According to the present embodiment, the following such functions and effects can be exhibited:

(1) A transceiver 51 is attached to the circumferential surface of the measurement tool 32, a communication module 52 which can communicate with this transceiver 51 is arranged in the storage region MS, an openable and closeable shutter 40 which connects and disconnects the working region WS and storage region MS is provided between the workpiece W and the tool magazine 20, and a shutter 40 is closed when working a workpiece. Due to this, when working a workpiece, chips, fluid, and other splatter can be prevented from depositing on the surfaces of the transceiver 51 and communication module 52. For this reason, when working a workpiece, good communication through a spatial carrier wave becomes possible between the transceiver 51 and the communication module 52.

As reference examples of the present embodiment, it may be considered to add other various defensive systems, for example, to cover the communication module 52 inside the working region by a transparent cover and blow air through the transparent cover so as to prevent deposition of chips or fluid, or to place the communication module 52 in a special storage box, open the lid of the storage box at the time of measurement, and close the lid at the time of a working operation, etc. However, in the present embodiment, the communication module 52 is just arranged inside of the shutter 40 which is originally present between the working region WS and the storage region MS, that is, at the storage region MS side of the tool, so there is the advantage, unlike in the reference example, of no new protective system being required at all for chips or fluid.

(2) When measuring a workpiece, the shutter 40 is left in the open state by the processing at the control unit 70. Therefore, the spatial carrier wave between the transceiver 51 and the communication module 52 can be prevented from being blocked by the shutter 40. Due to this, it is possible to use a spatial carrier wave comprised of an infrared beam and possible to simplify the configuration of the transceiver.

(3) When measuring a workpiece, further, the empty gripper 222 for the measurement tool is arranged at the tool change position Pa by the processing at the control unit 70. Therefore, there is no shutter 40, tool 30, or other obstruction (blocking object) interposed between the transceiver 51 and the communication module 52 and reliable communication between the transceiver 51 and the communication module 52 is possible.

(4) When measuring a workpiece, the phase of the measurement tool 32 is shifted. That is, at the start and at the end of measurement of the workpiece, the receiver 51*a* of the circumferential surface of the measurement tool 32 faces the communication module 52 side, and when measuring the workpiece by the touch probe 32*e*, a transmitter 51*b* faces the communication module 52 side. Due to this, it is possible to use the transceiver 51 attached to the circumferential surface of the measurement tool 32 to easily receive a power on-off command from the communication module 52 and possible to easily send an on-off signal of the touch probe 32*e* to the communication module 52.

(5) When measuring a workpiece, a signal from the communication module 52 is used to turn the power of the measurement tool 32 on, so consumption of the battery power of the measurement tool 32 can be suppressed.

(6) Since the sensor part of the measurement tool 32 is configured by a touch probe 32*e*, it is possible to simplify the circuit configuration of the sensor part and to suitably use for a measurement tool 32 which sends and receives a spatial carrier wave.

In the above embodiment, the storage region MS and the working region WS are provided at the top and bottom of the space inside the covers 100 of the machine tool. However, so long as providing the storage region MS adjacent to the working region WS, the storage region MS and the working region WS may be provided reversed up to down or may be provided adjoining each other left and right. Therefore, the arrangement of the shutter 4 provided between the workpiece W and the tool magazine 30 in an openable and closeable manner is not limited to the one explained above.

In the above embodiment, although a single receiver 51*a* and a plurality of transmitters 51*b* are attached to the circumferential surface of the measurement tool 32, the configuration of the transceiver 51 is not limited to this. For example, it is also possible to attach a single transmitter 51*b* or a plurality of receivers 51*a*. Further, it is also possible to attach a plurality of receivers 51*a* and a plurality of transmitters 51*b* so as to arrange any of these to face the communication module 52, and thereby eliminate the need for matching the phase of the measurement tool 32. Instead of providing the communication module 52 in a fixed manner at the inside of a gripper 22 at the peripheral edge of the tool magazine 20, the communication module 52 may also be provided at another position inside the storage region MS which does not interfere with the tool magazine 20. Further, the communication module 52 may be arranged in the tool magazine 20.

Further, the measurement tool 32 is not configured so as to have a transceiver 51 comprised of a receiver 51*a* and transmitters 51*b*, but may be configured so as to have only transmitters 51*b* which transmit on-off signals of the touch probe 32*e*. In this case, a switch may be provided so that when the measurement tool 32 is attached to the spindle 10, the power of the touch probe 32*e* is turned on, while when it is detached from the spindle 10, the power is turned off, and the communication module 52 may be configured so as to have just a receiver 52*a* which receives on-off signals from the transmitters 51*b*.

Although the circumferential edge of the tool magazine 20 is provided with working tool grippers 221 (first storage units) and a measurement tool gripper 222 (second storage unit) which have pairs of handle members 22*a*, the first storage units and the second storage unit comprised of the grippers 22 are not limited in shape to the above. The tool magazine 20 is not configured as a rotary member indexable to rotate by an indexing motor 26, but for example, may also be configured as a so-called chain type tool magazine, which is chain driven so that the tools 30 circle around a fixed frame.

The indexing drive unit comprised of the indexing motor 26 is controlled so that when the measurement tool 32 is attached to the spindle 10, the measurement tool gripper 222 is positioned between the transceiver 51 and the communication module 52 However, the processing of the tool magazine control unit comprised of the control unit 70 may be any processing so long as controlling the indexing motor 26 so that the empty gripper 222 is positioned on the path of the spatial carrier wave.

In the above embodiment, although the front end portion of the measurement tool 32 is provided with a touch probe 32e and the front end portion of the touch probe 32e is made to contact the surface of the workpiece to measure the workpiece dimensions, the configuration of the measurement tool 32 is not limited to this. For example, it is also possible to use a measurement tool 32 which has a noncontact type sensor. In the above, although the explanation is given with reference to the example of a horizontal machining center, the present invention can also be similarly applied to a vertical machining center or a machine tool other than a machining center as well.

According to the present invention, a transceiver is attached to a measurement tool, a communication module which can communicate with this transceiver is arranged in the storage region, and a shutter which can open and close to connect and disconnect the working region and storage region between the workpiece and the tool magazine. Due to this, when working the workpiece, chips, fluid, and other splatter can be prevented from sticking the surface of the communication module and good communication becomes possible between the transceiver and the communication module via a carrier wave.

The invention claimed is:

1. A machine tool having a workpiece measurement function for measuring a dimension of a workpiece, comprising:

a tool magazine arranged in a storage region adjacent to a working region of a workpiece to store a working tool for working the workpiece and a measurement tool for measuring the workpiece;

a spindle to which the measurement tool is attached in a detachable manner, the spindle being provided in a movable manner relative to the workpiece;

a shutter provided between the working region and the storage region in an openable and closable manner;

an open-close drive unit opening and closing the shutter;

a shutter control unit controlling the open-close drive unit such that the shutter closes at a time of working a workpiece when the working tool is attached to the spindle, and the shutter opens at a time of measuring a workpiece when the measurement tool is attached to the spindle; and a communication module arranged in the storage region to communicate with the measurement tool attached to the spindle.

2. The machine tool having the workpiece measurement function according to claim 1, wherein the tool magazine is a rotary member having a first storage part for storing the working tool and a second storage part for storing the measurement tool, arranged at a circumferential edge of the rotary member, the rotary member being indexable to rotate about a rotary axis, the circumferential edge being located at a radial distance from the rotary axis, the machine tool further comprises an index drive unit indexing the tool magazine and a tool magazine control unit controlling the index drive unit, the communication module is arranged adjacent the tool magazine, and the tool magazine control unit controls the indexing drive unit so that, in a state where the measurement tool stored in the second storage part is attached to the spindle and the second storage part is empty, the empty second storage part is positioned between the measurement tool and the communication module.

3. The machine tool having the workpiece measurement function according to claim 1, wherein the measurement tool has a touch probe.

* * * * *